(12) United States Patent
Ambroladze et al.

(10) Patent No.: US 10,169,260 B2
(45) Date of Patent: ***Jan. 1, 2019

(54) MULTIPROCESSOR CACHE BUFFER MANAGEMENT

(71) Applicant: International Business Machines Corporation, Armonk, NY (US)

(72) Inventors: Ekaterina M. Ambroladze, Los Angeles, CA (US); Deanna P. Berger, Hyde Park, NY (US); Michael Fee, Cold Spring, NY (US); Arthur J. O'Neill, Jr., Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,920

(22) Filed: Dec. 15, 2017

(65) Prior Publication Data

US 2018/0107617 A1    Apr. 19, 2018

Related U.S. Application Data

(63) Continuation of application No. 14/608,373, filed on Jan. 29, 2015, now Pat. No. 9,892,067.

(51) Int. Cl.
*G06F 13/16* (2006.01)
*G06F 13/42* (2006.01)
*G06F 13/40* (2006.01)

(52) U.S. Cl.
CPC ...... *G06F 13/1673* (2013.01); *G06F 13/1652* (2013.01); *G06F 13/4022* (2013.01); *G06F 13/4234* (2013.01)

(58) Field of Classification Search
CPC ............ G06F 13/1673; G06F 13/4234; G06F 13/4022; G06F 13/1652
See application file for complete search history.

(56) References Cited

U.S. PATENT DOCUMENTS 4,760,515 A    7/1988   Malmquist et al.
5,829,033 A    10/1998  Hagersten et al.
(Continued)

FOREIGN PATENT DOCUMENTS

JP        2000035954 A      2/2000

OTHER PUBLICATIONS

Disclosed Anonymously et al., "Method and Apparatus for Dynamic Cache Bypass and Insertion", An IP.com Prior Art Databse Technical Disclosure, Nov. 20, 2012, IP.com No. IPCOM000223644D.

(Continued)

*Primary Examiner* — Nimesh G Patel
(74) *Attorney, Agent, or Firm* — Edward J. Wixted, III

(57) ABSTRACT

In an approach for managing data transfer across a bus shared by processors, a request for a first set of data is received from a first processor. A request for a second set of data is received from a second processor. First portions of the first set of data and the second set of data are written to a buffer. Additional portions of each set of data are written to the buffer as portions are received. It is determined that a portion of the first set of data has a higher priority to the bus than a portion of the second set of data based on a priority scheme, wherein the priority scheme is based on return progress of each respective set of data having at least a portion of data in the buffer. The portion of the first set of data is granted access to the bus.

20 Claims, 3 Drawing Sheets

(56) References Cited

U.S. PATENT DOCUMENTS

| | | | |
|---|---|---|---|
| 5,935,230 | A | 8/1999 | Pinai et al. |
| 2002/0062414 | A1 | 5/2002 | Hofmann et al. |
| 2003/0005239 | A1 | 1/2003 | Dover |
| 2006/0064569 | A1 | 3/2006 | Lentz et al. |
| 2008/0046736 | A1 | 2/2008 | Arimilli et al. |
| 2009/0070498 | A1 | 3/2009 | Drapala et al. |
| 2009/0198907 | A1 | 8/2009 | Speight et al. |
| 2009/0198909 | A1 | 8/2009 | Speight et al. |
| 2016/0019151 | A1 | 1/2016 | Venkatasubramanian et al. |
| 2016/0224481 | A1 | 8/2016 | Ambroladze et al. |

OTHER PUBLICATIONS

IBM et al., "Multi-Processor Bus Distributed Arbitration with Centralized Fairness", An IP.com Prior Art Database Technical Disclosure, Apr. 1, 1992, TDB n11 04-92 p. 200-208, IP.com No. IPCOM000108015D, IP.com Electronic Publication: Mar. 22, 2005.

Yoon et al., "Optimizing Tunable WCET with Shared Resource Allocation and Arbitration in Hard Real-Time Multicore Systems", 2011 32nd IEEE Real-Time Systems Symposium, pp. 227-238, © 2011 IEEE, DOI 10.1109/RTSS.2011.28.

IBM, List of Patent Applications Treated as Related, "Appendix P", Dated Dec. 15, 2017, 2 pages.

MULTIPROCESSOR CACHE BUFFER MANAGEMENT

BACKGROUND

The present invention relates generally to the field of cache management, and more particularly to arbitration and distribution of data resources to multiple central processing units (CPUs) over a shared bus.

A multi-core processor is a single computing component with two or more independent actual central processing units (CPUs) (i.e., cores), which are the processing units that read and execute program instructions. The instructions are ordinary CPU instructions, such as add, move data, and branch, but the multiple cores allow for multiple instructions to be executed at the same time, potentially increasing overall speed. Manufacturers typically integrate the cores onto a single integrated circuit die, or onto multiple dies in a single chip package. Cores may, or may not, share one or more caches.

A data buffer is a region of a physical memory storage used to temporarily store data while it is being moved from one place to another. Buffers can be implemented in a fixed memory location in hardware—or by using a virtual data buffer in software, pointing at a location in physical memory. Buffers are usually used in a first in, first out (FIFO) method, outputting data in the order it arrived. Buffers can increase performance by allowing synchronous operations, such as reads or writes, to complete quickly, instead of inhibiting performance while waiting for hardware interrupts to access slower memory.

A bus is a communication system that transfers data between components inside a computer, or between computers. A bus may include all related hardware components (wire, optical fiber, etc.) and software, including communication protocols.

SUMMARY

Aspects of an embodiment of the present invention disclose a method, computer program product, and computer system for managing data transfer across a bus shared by multiple processors. A request for a first set of data is received from a first processor in a set of processors sharing a bus. A request for a second set of data is received from a second processor in the set of processors sharing the bus. A first portion of the first set of data and a first portion of the second set of data is written to a buffer. Additional portions of the first set of data and additional portions of the second set of data are written to the buffer as each additional portion is received. It is determined that a portion of the first set of data has a higher priority to the bus than a portion of the second set of data based on a priority scheme, wherein the priority scheme is based on, at least, return progress of each respective set of data having at least a portion of the respective set of data pending in the buffer. The portion of the first set of data is granted access to the bus.

DETAILED DESCRIPTION

Embodiments of the present invention recognize that increasing the number of processing units contained on a single chip with a shared cache can result in performance decrease due to physical limitations (e.g., not enough wire tracks, limited space) that prevent the assignment of dedicated fetch data return buses to each processing unit. Embodiments of the present invention recognize that fetch data, for a number of different processing units, must be able to share a bus efficiently in order to reduce the negative effect on performance. Embodiments of the present invention provide an approach to provide arbitration for the use of a single data bus that drives data to multiple processing units. Embodiments of the present invention recognize that performance requirements may require that fetch data returned from local (i.e., on-chip) cache hits and remote (i.e., off-chip) cache hits each be returned as quickly as possible to reduce fetch latency.

The present invention will now be described in detail with reference to the Figures.

Figure 1:
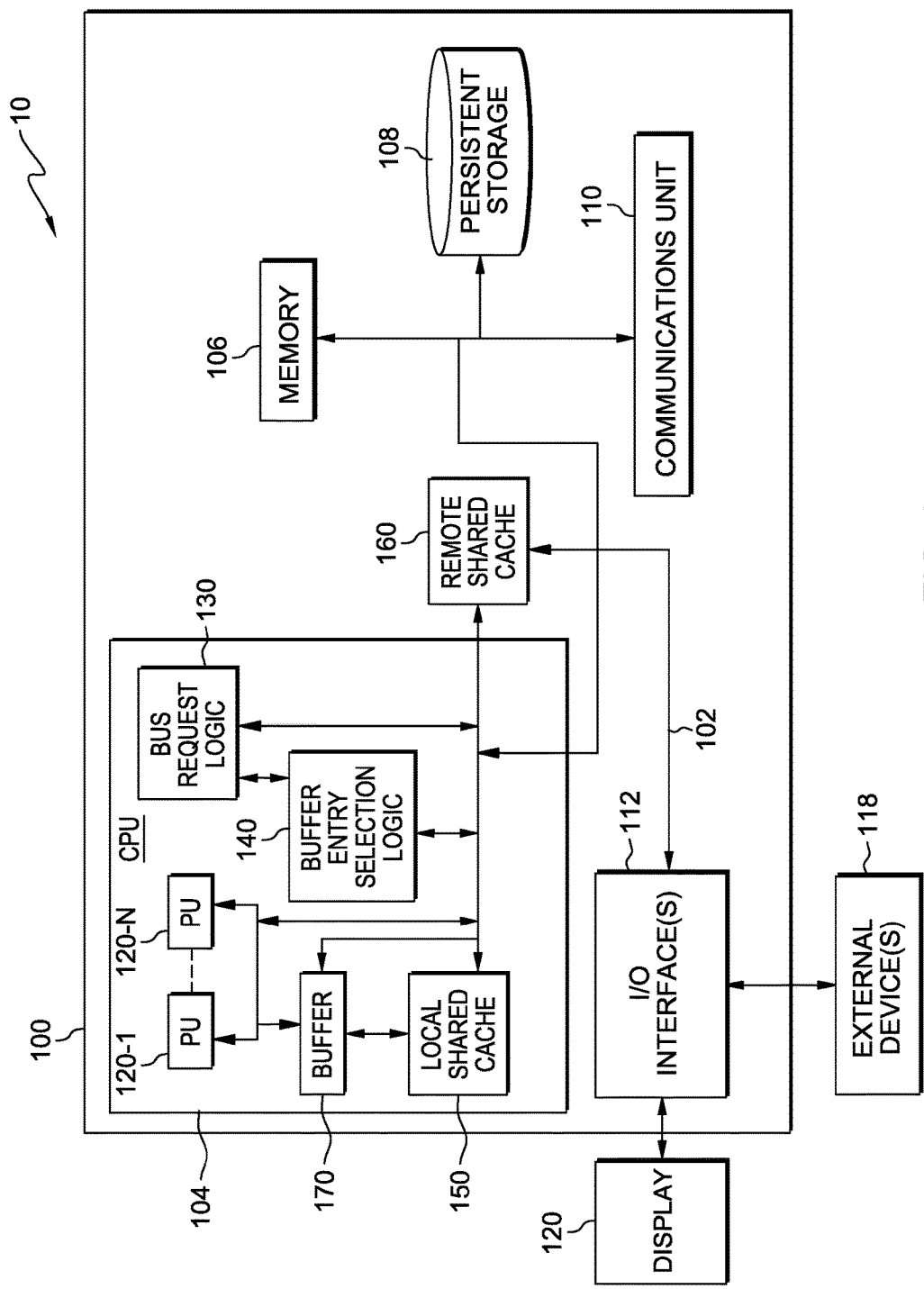
FIG. 1 is a block diagram of a data processing environment, in accordance with one embodiment of the present invention.

FIG. 1 is a functional block diagram illustrating a distributed data processing environment, generally designated 10, in accordance with one embodiment of the present invention. FIG. 1 depicts a block diagram of components of computing device 100, in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made.

Computing device 100 may be a management server, a web server, or any other electronic device or computing system capable of receiving and sending data, and processing program instructions. In some embodiments, computing device 100 may be a laptop computer, tablet computer, netbook computer, personal computer (PC), a desktop computer, or any programmable electronic device.

Computing device 100 includes bus 102, which provides communications between processing units (PUs) 120-1 through 120-N, bus request logic 130, buffer entry selection logic 140, local shared cache 150, remote shared cache 160, buffer 170, memory 106, persistent storage 108, communications unit 110, and input/output (I/O) interface(s) 112. Bus 102 can be implemented with any architecture designed for passing data and/or control information between processors (such as microprocessors, communications and network processors, etc.), system memory, peripheral devices, and any other hardware components within a system. Bus 102 can be implemented with, for example, one or more buses or a crossbar switch. In general, bus 102 is a communications fabric.

CPU 104 may be a multi-core processor including PUs 120-1 through 120-N. A multi-core processor is a single computing component with two or more independent actual CPUs (e.g., PU 120-1 through PU 120-N), which are the processing units that read and execute program instructions.

CPU includes PUs 120-1 through 120-N, buffer 170, local shared cache 150, bus request logic 130, and buffer entry selection logic 140.

PUs 120-1 through 120-N may each be an individual processor located on CPU 104. In general, PUs 120-1 through 120-N share existing communication fabric, such as bus 102, within computing device 100 and data processing environment 10. In some embodiments, multiple instances of bus 102 may be used within CPU 104, shared by a subset of the total number of PUs 120-1 through 120-N on CPU 104. PUs 120-1 through 120-N may each request data from one or more data sources, such as, for example, local shared cache 150, remote shared cache 160, memory 106, or persistent storage 108. Each PU of PUs 120-1 through 120-N may also have additional levels of cache (e.g. L1, L2) located on-chip that are not shared among PUs 120-1 through 120-N, and rather are exclusively accessible and usable by individual PUs of PUs 120-1 through 120-N. In embodiments of the present invention, there may be any number of PUs 120, as indicated by the annotation PU 120-1 through PU 120-N. In general, two or more PUs 120 may exist within CPU 104. As used herein, PU 120 refers to any single PU of PUs 120-1 through 120-N.

Memory 106 and persistent storage 108 are computer readable storage media. In this embodiment, memory 106 includes random access memory (RAM). In general, memory 106 can include any suitable volatile or non-volatile computer readable storage media. In general, data stored to memory 106 may, responsive to a request from a PU of PUs 120-1 through 120-N, be routed to buffer 170, or directly to bus 102 (e.g., a first portion of data sources from memory 106 may be routed directly to bus 102, while each additional portion of data from the data stream is written to buffer 170), based on bus request logic 130 and/or buffer entry selection logic 140.

Local shared cache 150 is a fast memory, located on the same integrated circuit die or single chip package as PUs 120-1 through 120-N (e.g., CPU 104), that enhances the performance of CPU 104 by holding recently accessed data, and data near accessed data, from memory 106. Local shared cache 150 may be, for example, local L3 cache. In general, data stored to local shared cache 150 may, responsive to a request from a PU of PUs 120-1 through 120-N, be routed to buffer 170, or directly to bus 102, based on bus request logic 130 and/buffer entry selection logic 140.

Remote shared cache 160 is a fast memory, located off-chip from PUs 120-1 through 120-N (e.g., a location not on CPU 104), that enhances the performance of CPU 104 by holding recently accessed data, and data near accessed data, from memory 106. Remote shared cache 160 may be, for example, remote L3 cache, L4 cache, or other off-chip caches. In general, data stored to remote shared cache 150 may, responsive to a request from a PU of PUs 120-1 through 120-N, be routed to buffer 170, or directly to bus 102, based on bus request logic 130 and/or buffer entry selection logic 140.

Buffer 170 is a physical register file located in the on-chip data flow hardware and is used to temporarily store data while it is being moved from one place to another. Buffer 170 may act as a buffer when sending data to PU 120 from persistent storage 108, memory 106, remote shared cache 160, or local shared cache 150. In general, buffer 170 queues data requesting access to bus 102 until bus request logic 130 and/or buffer entry selection logic 140 cause the data to be sent to bus 102.

Buffer entry selection logic 140 operates to receive requests to pass data on a shared bus, such as bus 102 and identify the location of the data, whether the data should be sent on bus 102, or whether the data should be temporarily held within buffer 170. Buffer entry selection logic 140, along with bus request logic 130, also operates to select data written to buffer 170 to send on bus 102. Buffer entry selection logic 140 is communicatively connected to buffer 170. In the depicted embodiment, buffer entry selection logic 140 is logic located on CPU 104. In other embodiments, buffer entry selection logic 140 may reside elsewhere, provided buffer entry selection logic 140 is communicatively connected to bus 102.

Bus request logic 130 performs operations that select data entries written to buffer 170 to be sent on bus 102. In general, bus request logic 130 prioritizes particular data requests based on factors that include, for example, whether any data has been returned, whether only one data portion has been returned, or whether two consecutive data portions of a data stream have already been written to buffer 170 and are ready to be returned via bus 102 to the target PU of PUs 120-1 through 120-N.

Programs may be stored in persistent storage 108 and in memory 106 for execution by one or more of the respective CPUs 104 via local shared cache 150 and/or remote shared cache 160. In an embodiment, persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 108 may also be removable. For example, a removable hard drive may be used for persistent storage 108. Other examples include optical and magnetic disks, thumb drives, and smart cards that are inserted into a drive for transfer onto another computer readable storage medium that is also part of persistent storage 108.

Communications unit 110, in these examples, provides for communications with other data processing systems or devices. In these examples, communications unit 110 includes one or more network interface cards. Communications unit 110 may provide communications through the use of either or both physical and wireless communications links. Programs may be downloaded to persistent storage 108 through communications unit 110.

I/O interface(s) 112 allows for input and output of data with other devices that may be connected to computing device 100. For example, I/O interface 112 may provide a connection to external device(s) 118 such as a keyboard, keypad, a touch screen, and/or some other suitable input device. External device(s) 118 can also include portable computer readable storage media such as, for example, thumb drives, portable optical or magnetic disks, and memory cards. Software and data can be stored on such portable computer readable storage media and can be loaded onto persistent storage 108 via I/O interface(s) 112. I/O interface(s) 112 also connect to a display 120.

Display 120 provides a mechanism to display data to a user and may be, for example, a computer monitor.

Figure 2:
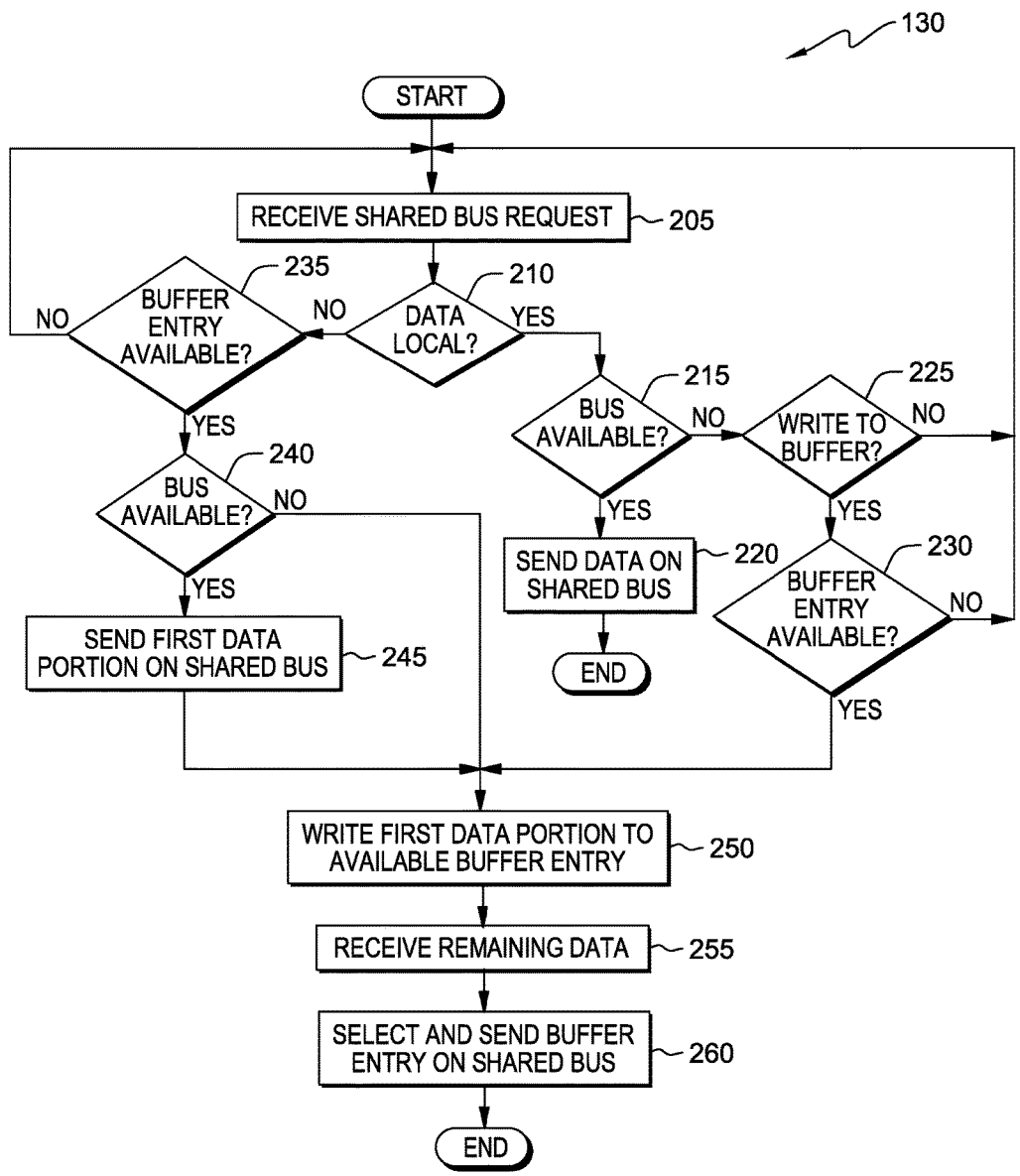
FIG. 2 depicts a flowchart of the steps of bus request logic executing within the data processing environment of FIG. 1, for queuing data within a shared buffer and/or sending data on a shared bus, in accordance with one embodiment of the present invention.

FIG. 2 depicts a flowchart of the steps of a bus request logic, executing within computing environment 10 of FIG. 1. Bus request logic 130, along with buffer entry selection logic 140, operates to queue data within buffer 170, and bus request logic 130 allows a data stream sourced from local shared cache 150 to bypass buffer 170, and/or allow a target portion of a data stream to bypass the arbitration scheme and bypass buffer 170, in accordance with an embodiment of the present invention.

In step 205, bus request logic 130 receives a shared bus request. Bus request logic 130 may receive a shared bus request via a control pipeline. The shared bus request may be, for example, a request to transfer data over bus 102 from local shared cache 150, remote shared cache 160, memory 106, or persistent storage 108, in response to a request for data by PU 120. As depicted, PUs 120-1 through 120-N share bus 102.

In decision 210, bus request logic 130 determines whether the requested data is located on a local memory location, such as local shared cache 150. Bus request logic 130 may determine whether the requested data is located on a local memory location, or alternatively a remote memory location (e.g., remote shared cache 160, memory 106, persistent storage 108), by identifying the location of the data within the architecture of computing device 100. A local memory location is on-chip (e.g., local shared cache 150), while a remote memory location is off-chip. If bus request logic 130 determines that the requested data is located on a local memory location (decision 210, yes branch), bus request logic determines whether bus 102 is available (see decision 215). If bus request logic 130 determines that the requested data is not located on a local memory location (decision 210, no branch), bus request logic 130 determines whether a buffer entry of buffer 170 is available (see decision 235).

In decision 215, bus request logic 130 determines whether bus 102 is available. In general, a bus is characterized by the amount of information that can be transmitted at once. "Width" refers to the number of bits that a bus, such as bus 102, can transmit at once. Bus speed is defined by frequency, which is the number of data packets sent or received per second. In some embodiments, bus request logic 130 maintains a bus busy model of the availability of bus 102, and consults the bus busy model to determine whether bus 102 is available. A bus busy model is a set of latches local to bus control logic that indicates when bus 102 is busy and when bus 102 is available. A bus busy model may be updated each cycle and can be referenced when making availability determinations. For example, for a data transfer that bypasses buffer 170, the data transfer may busy bus 102 for N cycles. The bus busy latches may then be updated to reflect that bus 102 will be busy for N cycles, and a counter (not shown) may be maintained to keep bus 102 marked busy for the next N cycles, or alternatively the next N-M cycles, where M is the cycle differential between a model and actual bus busy. In other embodiments, bus request logic 130 may determine whether bus 102 is available by examining characteristics of bus 102, such as bus speed and bus width. In addition, bus request logic 130 may determine whether bus 102 is available by examining data transfers already queued to buffer 170. If bus request logic 130 determines that bus 102 is available (decision 215, yes branch), bus request logic 120 sends the requested data (e.g., a data stream) on the shared bus (e.g., bus 102) (see step 220). If bus request logic 130 determines that bus 102 is not available (decision 215, no branch), bus request logic 130 determines whether the requested data should be written to buffer 170 (see decision 225).

In step 220, bus request logic 130 sends the requested data on the shared bus (e.g., bus 102). In some instances, the requested data may be larger, such that a multi-cycle line transfer is required. In such an embodiment, bus request logic 130 may cause additional logic (e.g., a bus modeling logic) to prevent any interruptions during the entire multi-cycle line transfer.

In decision 225, bus request logic 130 determines whether the requested data should be written to buffer 170. In some embodiments, a setting (e.g., a hardware switch setting) may indicate whether data located on local memory sources should be written to buffer 170. Bus request logic 130 may operate in accordance with the setting. If bus request logic 130 determines that the data should be written to buffer 170 (decision 225, yes branch), bus request logic 130 determines whether an entry to buffer 170 is available (see decision 230). If bus request logic 130 determines that the data should not be written to buffer 170 (decision 225, no branch), bus request logic 130 receives another shared bus request, and/or causes the previous shared bus request to be attempted again (see step 205).

In decision 230, bus request logic 130 determines whether an entry to buffer 170 is available. Buffer 170 is a physical register file located in the on-chip (e.g., processor 104) data flow hardware and is used to temporarily store data while it is being moved from one place to another. As such, buffer 170 has a limited amount of space and thus, a limited number of entries. In some embodiments, bus request logic 130 determines whether an entry to buffer 170 is available by identifying whether buffer 170 is full, or whether available entries are vacant. In some embodiments, the requested data may include one or more data packets, or one or more portions of data (e.g., doublewords, quadwords, octawords). In general, a data packet or portion of data is the smallest amount of data understandable by PU 120. In such an embodiment, bus request logic 130 determines whether an entry to buffer 170 is available for a data packet or a portion of the requested data. If bus request logic 130 determines that an entry to buffer 170 is available (decision 230, yes branch), bus request logic 130 writes the first data packet, or first data portion, to an available buffer entry (see step 250). If bus request logic 130 determines that an entry to buffer 170 is not available (decision 230, no branch), bus request logic 130 receives another shared bus request on the next clock cycle, and/or causes the previous shared bus request to be attempted again (see step 205).

In decision 235, bus request logic 130 determines whether an entry to buffer 170 is available. In some embodiments, bus request logic 130 determines whether an entry to buffer 170 is available similarly to as described with regard to step 230. If bus request logic 130 determines that an entry to buffer 170 is available (decision 235, yes branch), bus request logic 130 determines whether bus 170 is available (see step 240). If bus request logic 130 determines that an entry to buffer 170 is not available (decision 235, no branch), bus request logic 130 receives another shared bus request on the next clock cycle, and/or causes the previous shared bus request to be attempted again (see step 205).

In decision 240, bus request logic 130 determines whether bus 102 is available. In some embodiments, bus request logic 130 determines whether bus 102 is available similarly to as described with regard to step 215. If bus request logic 130 determines that bus 102 is available (decision 240, yes branch), bus request logic 120 sends a first data packet, or a first portion of data, of the requested data (e.g., a data stream) on the shared bus (e.g., bus 102) (see step 245). If bus request logic 130 determines that bus 102 is not available (decision 240, no branch), bus request logic 130 writes the first data packet, or first data portion, to an available buffer entry (see step 250).

In step 245, bus request logic 130 sends the first data packet, or first data portion, of the requested data on the shared bus (e.g., bus 102). In some embodiments, the first data packet, or first data portion, is sent on the shared bus (e.g., bus 102) in parallel with the start of writing the requested data to buffer 170. In some embodiments, the first data packet, or first data portion, is written in parallel to buffer 170. In other embodiments, only additional data packets, or data portions, are written to buffer 170.

In step 250, bus request logic 130 causes the first data portion, or first data packet, of the requested data to be written to an available entry of buffer 170. Data is written in buffer 170 to be sent on the shared bus (e.g., bus 102) in accordance with an arbitration algorithm, such as buffer entry selection logic 140 (see FIG. 3). Upon writing the first data packet or portion of data to buffer 170, bus request logic 130 causes the applicable buffer entry to begin requesting access to bus 102, in accordance with the rules of buffer entry selection logic 140 (see FIG. 3). Buffer entries are not required to wait to request access to bus 102 until the remaining data packets, or data portions, of the requested data have been written to buffer 170. The timing of the arrival of the remaining data packets into buffer 170 from off-chip sources (e.g., remote shared cache 160, memory 106) may not be fixed. In some embodiments, data arrives in streamlined back-to-back cycles, while in other embodiments a varying number of gaps may be present between arrivals of subsequent data portions that make up a complete data packet. In such embodiments, buffer entry selection logic 140 reserves space on buffer 170 for the complete data packet at the time of writing the first data portion, or first data packet, to buffer 170.

In step 255, bus request logic 130 receives remaining data. Remaining data includes, for example, additional data packets or portions of data for the requested data. Upon receiving each additional data packet or portion of data, bus request logic 130 may cause the received additional data packet or portion of data to request access to bus 102. In some embodiments, bus request logic 130 may continue to receive remaining data in parallel to other steps (e.g., step 260).

In step 260, bus request logic 130 selects a buffer entry of buffer 170 to send on bus 102. An arbitration algorithm, such as buffer entry selection logic 140 (see FIG. 3) may be utilized to select buffer entries to send on bus 102.

Figure 3:
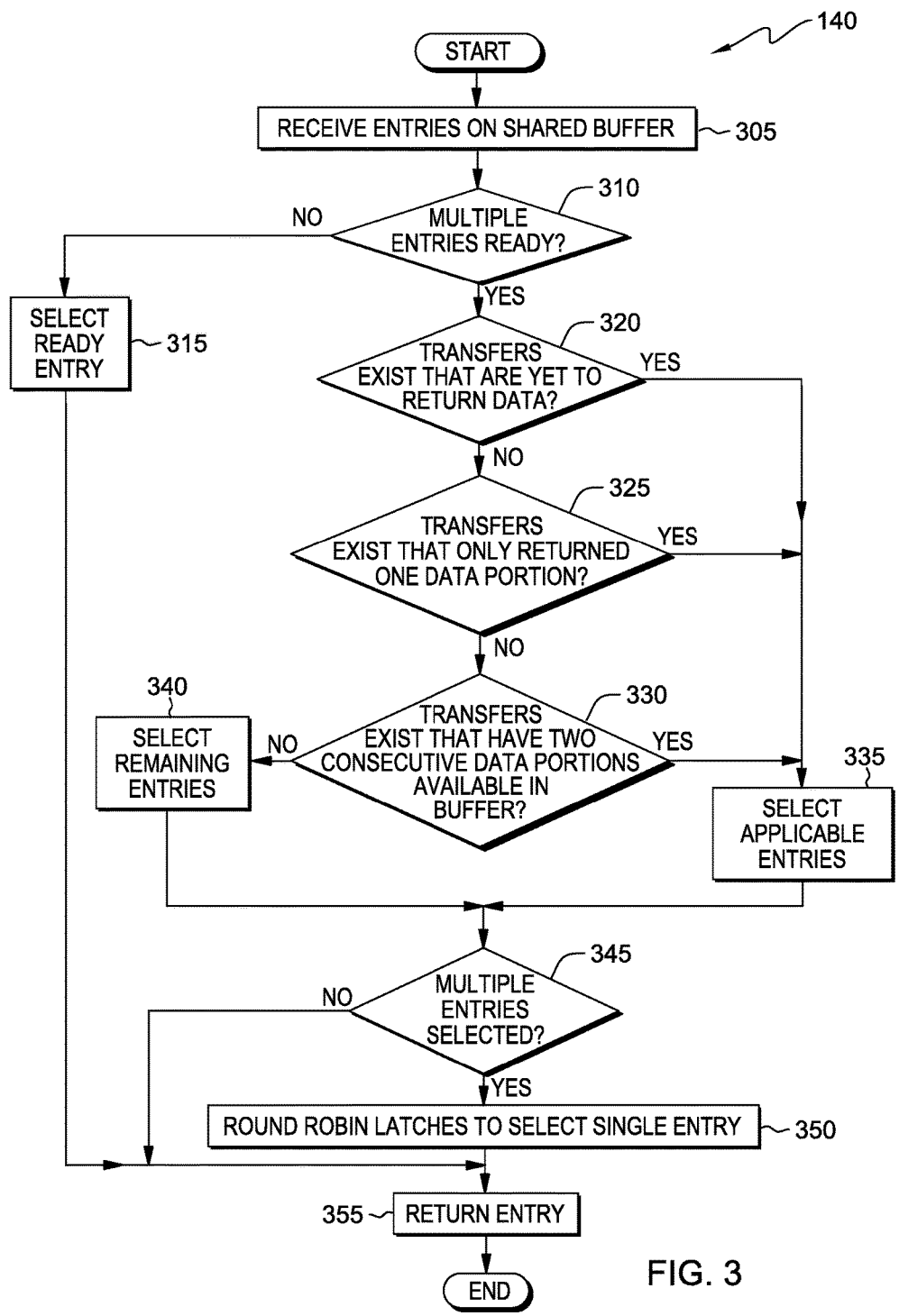
FIG. 3 depicts a flowchart of the steps of buffer entry selection logic executing within the data processing environment of FIG. 1, for selecting data from a queue within a shared buffer to send on a shared bus, in accordance with one embodiment of the present invention.

FIG. 3 depicts a flowchart of the steps of a buffer entry selection logic, executing within computing environment 10 of FIG. 1. Buffer entry selection logic 140 operates as a priority scheme to select data entries stored to buffer 170, such that bus request logic 130 can cause the selected entry to be sent on the shared bus (e.g., bus 102), in accordance with an embodiment of the present invention. In some embodiments, buffer entry selection logic 140 is a stand-alone set of logic. In other embodiments, buffer entry selection logic 140 may be a function of bus request logic (e.g., to perform operations described with regards to step 255 of FIG. 2).

In step 305, buffer entry selection logic 140 receives entries on buffer 170. In some embodiments, buffer entry selection logic 140 has access to buffer 170 and is monitors buffer 170 for existing entries. In another embodiment, bus request logic causes a notification to be sent to buffer entry selection logic indicating that entries are stored to buffer 170.

In decision 310, buffer entry selection logic 140 determines whether multiple entries are ready for transfer on bus 102. In some instances, only one entry may be ready for transfer on bus 102. An entry may be ready for transfer on bus 102 if, for example, a complete data packet, or portion of data, is stored to buffer 170. Buffer entry selection logic 140 may determine whether multiple entries are ready for transfer on bus 102 based on the number of entries stored to buffer 170 that have been received (see step 305) and have not yet been forwarded onto bus 102. If buffer entry selection logic 140 determines multiple entries are not ready (i.e., only a single entry is ready) (decision 310, no branch), buffer entry selection logic 140 selects the single ready entry for transfer on bus 102 (see step 315). If buffer entry selection logic 140 determines multiple entries are ready (decision 310, yes branch), buffer entry selection logic 140 determines whether transfer entries exist that have not yet returned any data (e.g., a target data packet, or data portion return is pending) (see decision 320).

In step 315, buffer entry selection logic 140 selects the single ready entry for transfer on bus 102. Buffer entry selection logic 140 selects this entry because it is the only entry ready for transfer on bus 102.

In decision 320, buffer entry selection logic 140 determines whether transfers exist that have not yet returned data. Transfer existing that have not yet returned data include, for example, a first target data packet in a stream of data requested by PU 120. Buffer entry selection logic 140 may determine whether transfers exist by, for example, monitoring buffer 170 to identify data packets, or portions of data, already sent on bus 102. In another embodiment, each data packet, or portion of data, may indicate the data packets position within a stream of data, and the total number of data packets in the stream of data. In such an embodiment, buffer entry selection logic 140 may examine such properties of the data packets stored to buffer 170 to determine whether transfers exist that have not yet returned data. In another embodiment, buffer entry selection logic 140 may maintain a data buffer model that keeps track of how much data each entry of buffer 170 has returned. If buffer entry selection logic 140 determines that transfers do exist that have not yet returned data (decision 320, yes branch), buffer entry selection logic 140 selects the applicable entry or applicable entries (see step 335). If buffer entry selection logic 140 determines that transfers do not exist (decision 320, no branch), buffer entry selection logic 140 determines whether transfers exist in buffer 170 that have only returned one portion of data, or one data packet (see decision 325).

In decision 325, buffer entry selection logic 140 determines whether transfers exist that have only returned one data portion, or data packet, and thus a reliant data portion, or mate data portion return is pending. Buffer entry selection logic 140 may determine whether transfers exist that have only returned one data portion similarly to how buffer entry selection logic 140 determines whether transfers exists that have not yet returned data (see decision 320). If buffer entry selection logic 140 determines that transfers do exists that have only returned one data portion (decision 325, yes branch), buffer entry selection logic 140 selects an applicable entry or applicable entries (see step 335). If buffer entry selection logic 140 determines that transfers do not exists that have only returned one data portion (decision 325, no branch), buffer entry selection logic 140 determines whether transfers exists that have accumulated two consecutive data portions in buffer 170 (see step 330).

In decision 330, buffer entry selection logic 140 determines whether transfers exists that have accumulated two consecutive portions of data in buffer 170. Buffer entry selection logic 140 may determine whether transfers exist that have accumulated two consecutive portions of data similarly to the approach described in decisions 320 and 325. In some embodiments, the two consecutive portions of data are portions of data twice the size of the portions of data, or data packets discussed with regard to decisions 320 and 325. For example, quadword as compared to octaword. If buffer entry selection logic 140 determines that transfers do exist that have accumulated two consecutive data portions or data packets in buffer 170 (decision 330, yes branch), buffer entry selection logic 140 selects the applicable entry or applicable entries (see step 335). If buffer entry selection logic 140 determines that transfer do not exist that have returned two consecutive data portions or data packets in buffer 170 (decision 330, no branch), buffer entry selection logic 140 selects any remaining entry or remaining entries within buffer 170 (see step 340).

In step 335, buffer entry selection logic 140 selects the applicable entry or applicable entries for transfer on bus 102. As described previously, applicable entries may be based upon the priorities discussed with regard to decisions 320, 325, and 330. Buffer entry selection logic 140 selects the appropriate applicable entry or applicable entries based upon the existence of entries conforming to decisions 320, 325, or 330. For example, the priority described in decision 320 has higher priority than the priorities described in either decision 325 or decision 330. Similarly, the priority described in decision 325 has a higher priority than the priority described in decision 330. In some embodiments, the priority arrangement may be different. In some embodiments, additional or fewer factors may exist that result in some change to the priority order described with regard to buffer entry selection logic 140. In general, buffer entry selection logic 140 selects one or more entries that correspond to the highest priority. For example, as depicted in FIG. 3, the highest priority is an entry that corresponds to a transfer that has yet to return data. Upon selecting the applicable entry or applicable entries, buffer entry selection logic 140 determines whether multiple entries have been selected (see decision 345).

In step 340, buffer entry selection logic 140 selects the remaining entry or any remaining entries for transfer on bus 102. Buffer entry selection logic 140 selects this entry or these entries, because no entry or entries corresponded to a priority, as described with reference to buffer entry selection logic 140.

In decision 345, buffer entry selection logic 140 determines whether multiple entries were selected. In some embodiments, buffer entry selection logic 140 determines whether multiple entries were selected based on the entry or entries selected during step 335 or step 340, as applicable in the current execution. If buffer entry selection logic 140 determines there are not multiple entries selected (e.g., there is only a single entry selected) (decision 345, no branch), buffer entry selection logic 140 returns the selected entry to bus request logic 130 (see step 355), such that bus request logic 130 may cause the selected entry to be sent on bus 102. If buffer entry selection logic 140 determines there are multiple entries selected of an equal priority level (decision 345, yes branch), buffer entry selection logic 140 uses round robin latches to select a single entry (see step 350).

In step 350, buffer entry selection logic 140 uses round robin latches to select a single entry when there are multiple entries of an equal priority level. In general, round robin scheduling allows for active data streams that have data packets to take turns transferring packets on a shared bus (e.g., bus 102) in a periodically repeated order. If one data stream is out of data packets, or other portions of data, buffer entry selection logic 140 allows for the next data stream to take the original data stream's place. According to this approach, multiple data streams that may be targeting several different PUs of PUs 120-1 through 120-N and/or different requesters within a target PU 120 can be interleaved with one another on bus 102. Based on the implementation of the round robin scheduling, buffer entry selection logic 140 selects one entry from buffer 170.

In step 355, buffer entry selection logic 140 returns the selected entry to bus request logic 130, such that bus request logic 130 can cause the selected entry to be sent on the shared bus (e.g., bus 102). In some instances, the selected entry was the only entry ready for transfer (see step 315). In other instances, the selected entry was a singe entry selected based upon the priority order, as discussed in reference to steps 320, 325, 330, 335, and 340. In still other instances the selected entry was the result of a round robin latches to select a single entry when, for example, multiple entries existing at a similar priority order. Regardless of the method by which the entry was selected, buffer entry selection logic 140 returns the selected entry to bus request logic 130, such that bus request logic 130 may cause the selected entry to be sent on bus 102. In some embodiments, upon returning the selected entry to bus request logic 130, buffer entry selection logic 140 will also update the round robin latches to reflect the entry previously selected and data subsequently transferred.

The logic described herein are identified based upon the application for which they are implemented in a specific embodiment of the invention. However, it should be appreciated that any particular logic nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, from a first processor in a set of processors sharing a bus, a request for a first set of data;
   receiving, from a second processor in the set of processors sharing the bus, a request for a second set of data;
   writing a first portion of the first set of data and a first portion of the second set of data to a buffer;
   writing additional portions of the first set of data and additional portions of the second set of data to the buffer as each additional portion is received;
   determining that a portion of the first set of data has a higher priority to the bus than a portion of the second set of data based on a priority scheme, wherein the priority scheme specifies priority to the bus based on a sequential order, wherein the sequential order comprises:
   (a) one or more sets of data that have not yet returned any portions of data; and
   (b) one or more sets of data that have only returned one portion of data; and
   granting the portion of the first set of data access to the bus.

2. The method of claim 1, further comprising:
   identifying that the first set of data is sourced from an off-chip storage location;
   determining that the bus is available; and
   granting the first portion of the first set of data access to the bus in parallel with writing the first portion of the first set of data to the buffer.

3. The method of claim 1, further comprising:
identifying that the second set of data is sourced from an off-chip storage location;
determining that the bus is available; and
granting the first portion of the second set of data access to the bus in parallel with writing the first portion of the second set of data to the buffer.

4. The method of claim 1, further comprising:
receiving, from a third processor in the set of processors sharing the bus, a request for a third set of data;
identifying that the third set of data is sourced from an on-chip storage location;
determining that the bus is available; and
granting the third set of data access to the bus prior to writing the portion of the first set of data and the portion of the second set of data to the buffer.

5. The method of claim 1, further comprising:
receiving, from a third processor in the set of processors sharing the bus, a request for a third set of data;
writing a first portion of the third set of data to the buffer;
writing additional portions of the third set of data to the buffer as each additional portion is received;
determining that a portion of the first set of data and a portion of the third set of data have an equal priority to the bus, based on the priority scheme; and
selecting the portion of the first set of data based on round robin latches.

6. The method of claim 1, wherein the sequential order further comprises:
(c) one or more sets of data that have at least two consecutive data portions available in the buffer; and
(d) additional existing one or more sets of data.

7. The method of claim 1, wherein each portion of each set of data is a quadword.

8. A computer program product comprising:
one or more computer readable storage media and program instructions stored on the one or more computer readable storage media, the program instructions comprising:
program instructions to receive, from a first processor in a set of processors sharing a bus, a request for a first set of data;
program instructions to receive, from a second processor in the set of processors sharing the bus, a request for a second set of data;
program instructions to write a first portion of the first set of data and a first portion of the second set of data to a buffer;
program instructions to write additional portions of the first set of data and additional portions of the second set of data to the buffer as each additional portion is received;
program instructions to determine that a portion of the first set of data has a higher priority to the bus than a portion of the second set of data based on a priority scheme, wherein the priority scheme specifies priority to the bus based on a sequential order, wherein the sequential order comprises:
(a) one or more sets of data that have not yet returned any portions of data; and
(b) one or more sets of data that have only returned one portion of data; and
program instructions to grant the portion of the first set of data access to the bus.

9. The computer program product of claim 8, the program instructions further comprising:
program instructions to identify that the first set of data is sourced from an off-chip storage location;
program instructions to determine that the bus is available; and
program instructions to grant the first portion of the first set of data access to the bus in parallel with writing the first portion of the first set of data to the buffer.

10. The computer program product of claim 8, the program instructions further comprising:
program instructions to identify that the second set of data is sourced from an off-chip storage location;
program instructions to determine that the bus is available; and
program instructions to grant the first portion of the second set of data access to the bus in parallel with writing the first portion of the second set of data to the buffer.

11. The computer program product of claim 8, the program instructions further comprising:
program instructions to receive, from a third processor in the set of processors sharing the bus, a request for a third set of data;
program instructions to identify that the third set of data is sourced from an on-chip storage location;
program instructions to determine that the bus is available; and
program instructions to grant the third set of data access to the bus prior to writing the portion of the first set of data and the portion of the second set of data to the buffer.

12. The computer program product of claim 8, the program instructions further comprising:
program instructions to receive, from a third processor in the set of processors sharing the bus, a request for a third set of data;
program instructions to write a first portion of the third set of data to the buffer;
program instructions to write additional portions of the third set of data to the buffer as each additional portion is received;
program instructions to determine that a portion of the first set of data and a portion of the third set of data have an equal priority to the bus, based on the priority scheme; and
program instructions to select the portion of the first set of data based on round robin latches.

13. The computer program product of claim 8, wherein the sequential order further comprises:
(c) one or more sets of data that have at least two consecutive data portions available in the buffer; and
(d) additional existing one or more sets of data.

14. The computer program product of claim 8, wherein each portion of each set of data is a quadword.

15. A computer system comprising:
one or more computer processors, one or more computer readable storage media, and program instructions stored on the computer readable storage media for execution by at least one of the one or more processors, the program instructions comprising:
program instructions to receive, from a first processor in a set of processors sharing a bus, a request for a first set of data;
program instructions to receive, from a second processor in the set of processors sharing the bus, a request for a second set of data;

program instructions to write a first portion of the first set of data and a first portion of the second set of data to a buffer;

program instructions to write additional portions of the first set of data and additional portions of the second set of data to the buffer as each additional portion is received;

program instructions to determine that a portion of the first set of data has a higher priority to the bus than a portion of the second set of data based on a priority scheme, wherein the priority scheme specifies priority to the bus based on a sequential order, wherein the sequential order comprises:

(a) one or more sets of data that have not yet returned any portions of data; and (b) one or more sets of data that have only returned one portion of data; and program instructions to grant the portion of the first set of data access to the bus.

16. The computer system of claim 15, the program instructions further comprising:

program instructions to identify that the first set of data is sourced from an off-chip storage location;

program instructions to determine that the bus is available; and program instructions to grant the first portion of the first set of data access to the bus in parallel with writing the first portion of the first set of data to the buffer.

17. The computer system of claim 15, the program instructions further comprising:

program instructions to identify that the second set of data is sourced from an off-chip storage location;

program instructions to determine that the bus is available; and program instructions to grant the first portion of the second set of data access to the bus in parallel with writing the first portion of the second set of data to the buffer.

18. The computer system of claim 15, the program instructions further comprising:

program instructions to receive, from a third processor in the set of processors sharing the bus, a request for a third set of data;

program instructions to identify that the third set of data is sourced from an on-chip storage location;

program instructions to determine that the bus is available; and program instructions to grant the third set of data access to the bus prior to writing the portion of the first set of data and the portion of the second set of data to the buffer.

19. The computer system of claim 15, the program instructions further comprising:

program instructions to receive, from a third processor in the set of processors sharing the bus, a request for a third set of data;

program instructions to write a first portion of the third set of data to the buffer;

program instructions to write additional portions of the third set of data to the buffer as each additional portion is received;

program instructions to determine that a portion of the first set of data and a portion of the third set of data have an equal priority to the bus, based on the priority scheme; and program instructions to select the portion of the first set of data based on round robin latches.

20. The computer system of claim 15, wherein the sequential order further comprises:

(c) one or more sets of data that have at least two consecutive data portions available in the buffer; and (d) additional existing one or more sets of data.

* * * * *